(12) United States Patent
Isenmann

(10) Patent No.: US 8,339,966 B2
(45) Date of Patent: Dec. 25, 2012

(54) ADAPTIVE ERROR COUNTER FOR A WIRELESS FIELD DEVICE

(75) Inventor: Andreas Isenmann, Haslach (DE)

(73) Assignee: VEGA Grieshaber KG, Wolfach (DE)

( * ) Notice: Subject to any disclaimer, the term of this patent is extended or adjusted under 35 U.S.C. 154(b) by 419 days.

(21) Appl. No.: 12/127,191

(22) Filed: May 27, 2008

(65) Prior Publication Data

US 2009/0003426 A1    Jan. 1, 2009

Related U.S. Application Data

(60) Provisional application No. 60/946,416, filed on Jun. 27, 2007.

(30) Foreign Application Priority Data

Jun. 27, 2007  (DE) .................. 10 2007 029 660

(51) Int. Cl.
G01R 31/08  (2006.01)

(52) U.S. Cl. ........................ 370/242; 370/252

(58) Field of Classification Search ............ 370/230.1, 370/231, 235, 242, 243, 244, 245, 252, 328, 370/338
See application file for complete search history.

(56) References Cited

U.S. PATENT DOCUMENTS

| | | | |
|---|---|---|---|
| 5,271,011 A | | 12/1993 | McMullan, Jr. et al. |
| 5,463,639 A | | 10/1995 | Koishi et al. |
| 5,815,507 A | * | 9/1998 | Vinggaard et al. ............ 714/704 |
| 6,067,458 A | * | 5/2000 | Chen ............................ 455/522 |
| 6,075,974 A | * | 6/2000 | Saints et al. .................... 455/69 |
| 6,144,936 A | * | 11/2000 | Jarvinen et al. ............... 704/226 |
| 6,507,740 B2 | * | 1/2003 | Shi ................................ 455/437 |
| 6,633,553 B1 | * | 10/2003 | Hwang ......................... 370/329 |
| 6,931,257 B2 | * | 8/2005 | Shahidi et al. ................ 455/522 |
| 7,024,508 B2 | * | 4/2006 | Gros et al. .................... 710/305 |
| 7,082,107 B1 | * | 7/2006 | Arvelo .......................... 370/311 |
| 7,319,418 B2 | * | 1/2008 | Fink .............................. 341/110 |
| 7,426,200 B2 | * | 9/2008 | Kim et al. ..................... 370/333 |
| 2005/0005227 A1 | | 1/2005 | Felbecker et al. |
| 2005/0078615 A1 | * | 4/2005 | Muri ............................. 370/277 |
| 2006/0049961 A1 | | 3/2006 | Deck et al. |

FOREIGN PATENT DOCUMENTS

| | | |
|---|---|---|
| DE | 10253572 | 7/2004 |
| DE | 10320157 | 11/2004 |
| EP | 1 447 969 | 8/2004 |
| WO | 96/18251 | 6/1996 |
| WO | 99/01944 | 1/1999 |
| WO | 2004/047043 | 6/2004 |
| WO | 2005/125042 | 12/2005 |
| WO | 2006/089760 | 8/2006 |

* cited by examiner

*Primary Examiner* — Ricky Ngo
*Assistant Examiner* — Christine Ng
(74) *Attorney, Agent, or Firm* — Fay Kaplun & Marcin, LLP

(57) ABSTRACT

A transmitting and receiving unit is provided for a field device for measuring a filling level or a pressure, which has an adaptive error counter. In this way, the sensitivity of the error detection may be adapted to individual needs or to the present length of the communications section. Thus, during wireless communication an optimally set error counter may fundamentally be used according to the distance to be covered without any adjustment needing to be made for this on the user side.

14 Claims, 2 Drawing Sheets

ADAPTIVE ERROR COUNTER FOR A WIRELESS FIELD DEVICE

REFERENCE TO RELATED APPLICATION

This application claims the benefit of the filing date of German Patent Application Serial No. 10 2007 029 660.8 filed 27 Jun. 2007 and of U.S. Provisional Patent Application Ser. No. 60/946,416 filed on 27 Jun. 2007, the disclosure of which applications is hereby incorporated herein by reference.

FIELD OF THE INVENTION

The present invention relates to level measurement and pressure measurement. In particular, the present invention relates to a transmitting and receiving unit for a field device for measuring a filling level or a pressure, a filling level measuring device having a transmitting and receiving unit, a pressure measuring device having a transmitting and receiving unit, the use of a transmitting and receiving unit for level measurement, the use of a transmitting and receiving unit for pressure measurement and a method for measuring a level or a pressure.

TECHNOLOGICAL BACKGROUND OF THE INVENTION

In wired digital communication, there are so-called retry counters. These retry counters determine how frequently a telegram is repeated before the communication is considered to be perturbed.

For each type of communication, a compromise is today made between the number of tolerable individual communications and the required reaction time to an occurring communication fault and this is implemented in the form of a fixed retry counter in the firmware or as a variably pre-adjustable retry counter. During the run time of the system this counter is not changed by the system itself.

The required or tolerable retry counter must be determined and is then fixedly preset.

SUMMARY OF THE INVENTION

A transmitting and receiving unit for a field device for measuring a filling level or a pressure, a filling level measuring device having a transmitting and receiving unit, a pressure measuring device having a transmitting and receiving unit, the use of a transmitting and receiving unit for filling level measurement, the use of a transmitting and receiving unit for pressure measurement and a method for measuring a filling level or a pressure are provided according to the features of the independent claims.

The exemplary embodiments of the invention shown relate equally to the transmitting and receiving unit, the filling level measuring device, the pressure measuring device, the use for filling level measurement, the use for pressure measurement and the method for measuring a filling level or a pressure.

According to one exemplary embodiment of the present invention, a transmitting and receiving unit for a field device for measuring a filling level or a pressure is provided, said transmitting and receiving unit comprising an adaptive error counter for detecting a number of defectively received data packets, wherein the transmitting and receiving unit is designed for wireless reception of the data packets via a communication path or communication link and wherein the adaptive error counter is designed for comparison of the detected number of defectively received data packets with an adaptive threshold value.

In other words, the transmitting and receiving unit may sum the number of defectively received data packets. The sum is then compared with the threshold value. The threshold value is suitably adapted according to the requirements and/or external conditions. This adaptation of the threshold value takes place automatically, for example, depending on the transit time of the transmitted data packets (that is, depending on the length of the communications section).

However, the adaptation of the threshold value may be made, for example, with reference to the measured signal strength of the wireless communication. It may also be possible to make the threshold value adaptation with reference to the measured distance between the devices involved in the communication. In this case, in a first embodiment the distance between the communication devices may be determined directly by means of a distance measuring device.

According to a further exemplary embodiment of the present invention, each communication device may determine its own position, for example, by means of a built-in GPS receiver. The distance between the devices is then determined whereby one device interrogates the position of the other device via the communication path and calculates with its own position. Thus, the number of allowed successive defective telegrams may be adapted to the range of the wireless communication section. The adaptation may be made dynamically during the transit time of the entire system.

The data packet always consists of an enquiry telegram and a following reply telegram. A possible cause for a defectively received data packet may be an incompletely received enquiry or reply telegram or a completely absent reply telegram. Whether an enquiry or reply telegram was completely received may be ensured both by specifying the telegram length in the telegram itself or additionally by a CRC check, that is a cyclic redundancy check. Only correctly and completely received enquiry telegrams will be answered so that an defectively received enquiry telegram leads to the absence of the reply telegram.

According to a further exemplary embodiment of the present invention, the adaptive error counter is designed for outputting a fault message when the number of defectively received data packets exceeds the threshold value.

The defectively received data packets are therefore counted and if too many defectively received data packets are encountered, an alarm is triggered, for example, or another error message is sent.

The sent error message can be transmitted, for example, to the corresponding transmitting device which thereupon, for example, increases the transmission intensity, takes another measure to improve the transmission quality or simply documents the error message. The intervention of a user is not required for this. If there are too many defectively received data packets, the receiving device goes into the secure state and notifies the present communication fault in this way, for example, to a superior management system.

According to another exemplary embodiment of the present invention, the transmitting and receiving unit is designed for changing the adaptive threshold value during operation of the receiving unit.

Thus, a continuous adaptation of the threshold value to the instantaneous conditions may take place during the normal operation of the field device. For example it may be that at a certain time, an increased robustness to faults is required. In order to achieve this, the threshold value can be set suitably high. If, on the other hand, a more sensitive error detection is required at a different time, the threshold value can be suitably reduced.

In particular, the adaptive threshold value may be dynamically changed by the transmitting and receiving unit depending on a signal transit or transmission time (between sending and receiving of the signal), a measured signal strength and/or a determined distance between a transmitting station and the receiving station.

According to a further exemplary embodiment of the present invention, the change of the adaptive threshold value takes place automatically. Intervention on the user side is not required.

According to a further exemplary embodiment of the present invention, the transmitting and receiving unit is designed for determining the adaptive threshold value on the basis of information provided by a user. For example, the system obtains from the user the specification as to how tolerantly the system should operate. This can be effected, for example, by selecting the form "short radio range", "medium radio range" or "long radio range".

According to a further exemplary embodiment of the present invention, the transmitting and receiving unit is designed for independent determination of the adaptive threshold value within predefined limiting values based on a statistical evaluation of the quality of a running radio communication.

The system determines the value within predefined limiting values itself, by making a statistical evaluation of the running communication. This evaluation may be made by a counter integrated in the device which makes long-term observations. If increased radio interference occurs statically, the system will automatically become more tolerant, for example, by suitably reducing the threshold value. Such an automatic re-adjustment of the threshold value may be necessary, for example as a result of changing ambient conditions such as rain, snowfall, different growth of deciduous trees due to the seasons or atmospheric interference.

A re-adjustment of the threshold value may also be made on the basis of the measured history of the radio transmission (optionally paired with an error evaluation which has been made). Thus, for example, the threshold value in winter may be different to that in summer. Or, the set threshold value at times of increased radio traffic may be different to that at times at which less interfering external radio traffic takes place normally.

According to a further exemplary embodiment of the present invention, the transmitting and receiving unit is designed for determining the adaptive threshold value on the basis of a measurable quantity of the radio communication.

The system uses, for example, as a measurable quantity the so-called RSSI (signal strength) in order to set the tolerance regarding the communication fault.

RSSI is the abbreviation for "received signal strength indication" and is an indicator for receiving field strength of cableless communication applications.

This indicator can therefore be used by the transmitting and receiving unit to find a useable channel for the communication or to set an appropriate threshold value for the error detection. If the signal strength now falls below a certain minimum strength, the threshold value can be suitably increased so that an increased number of transmission repetitions can take place before the transmission is classified as defective.

According to a further exemplary embodiment of the present invention, the detected number of defectively received data packets only comprises data packets which were received successively by the transmitting and receiving unit.

According to a further exemplary embodiment of the present invention, the field device is designed as a filling level radar.

A filling level measuring device which has a transmitting and receiving unit described above is also provided.

A pressure measuring device which has a transmitting and receiving unit described above is also provided.

According to a further exemplary embodiment of the present invention, the use of a transmitting and receiving unit for filling level measurement is specified. According to a further exemplary embodiment of the present invention, the use of a transmitting and receiving unit for pressure measurement is specified.

Furthermore provided is a method for measuring a filling level or a pressure, in which a number of defectively received data packets is detected and the detected number of defectively received data packets is compared with an adaptive threshold value, wherein the data packets are received in a wireless manner by means of a communication path.

According to a further exemplary embodiment of the present invention, the method furthermore comprises outputting a fault message when the number of defectively received data packets exceeds the threshold value.

According to a further exemplary embodiment of the present invention, a change in the adaptive threshold value takes place during operation of the receiving unit.

Exemplary embodiments of the present invention are described hereinafter with reference to the figures.

SHORT DESCRIPTION OF THE FIGURES

DETAILED DESCRIPTION OF EXEMPLARY EMBODIMENTS

Figure 1:
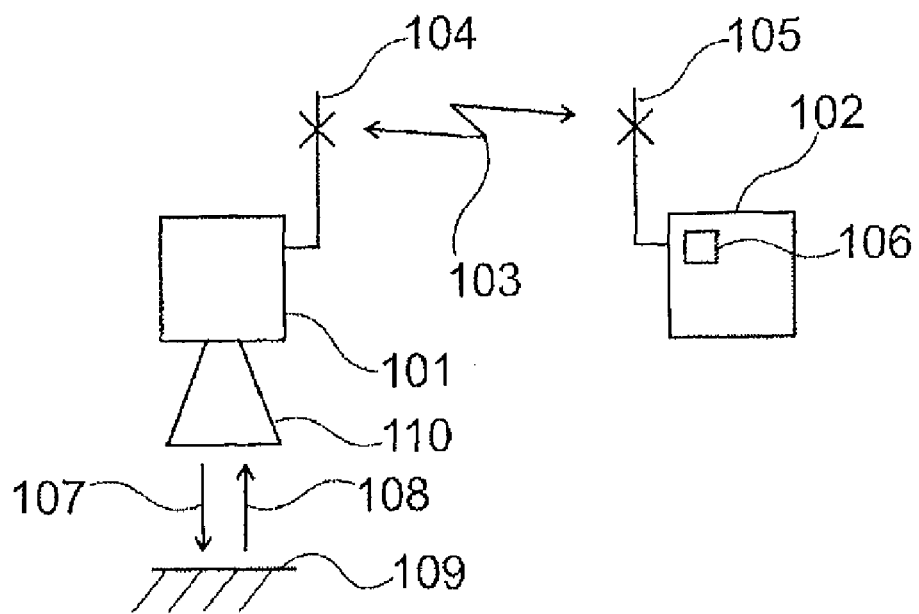
FIG. 1 shows a schematic diagram of a transmitting and receiving unit comprising a field device according to one exemplary embodiment of the present invention, wherein the transmitting and receiving unit is in wireless communication with a control unit.

The diagrams in the figures are schematic and not to scale.

In the following description of the figures, the same reference numerals are used for the same or similar elements.

FIG. 1 shows a schematic diagram of a transmitting and receiving unit 104 which is integrated in a field device 101.

The field device comprises a filling level measuring device, for example, a filing level radar. However, it can also comprise a pressure measuring device, for example. The field device 101 comprises an antenna 110 which is designed for sending electromagnetic rays 107 in the direction of a product surface 109. The electromagnetic rays are reflected at the product surface 109 and are detected as the received signal 108 by the antenna 110.

The transmitting and receiving unit 104, for example, comprises a radio interface which exchanges digital data with a corresponding radio interface 105 of a base station 102 or control unit 102 via the communication path 103. The control unit 102 has an adaptive error counter 106. The adaptive error counter detects the number of defectively received data packets.

The communication between the field device 101 and the control unit 102 takes place, for example, digitally. In this digital communication the number of successive defective telegrams is used to regard the communication as perturbed. If this number is initialized with a high value, the communication is more robust towards faults. However, actual faults such as, for example, a failure of the field device 101, are only identified subsequently (more slowly) as errors. If the number is initialized with a lower value, individual communication faults may already lead to the detection of the fault.

According to one aspect of the present invention, the number of allowed successive defective telegrams is adapted to the range of the wireless communication section. This adaptation may be made dynamically, for example, during the running time of the entire system.

In other words, the retry counter is adapted automatically, for example, depending on the signal transit time, the measured signal strength or the determined distance.

Figure 2:
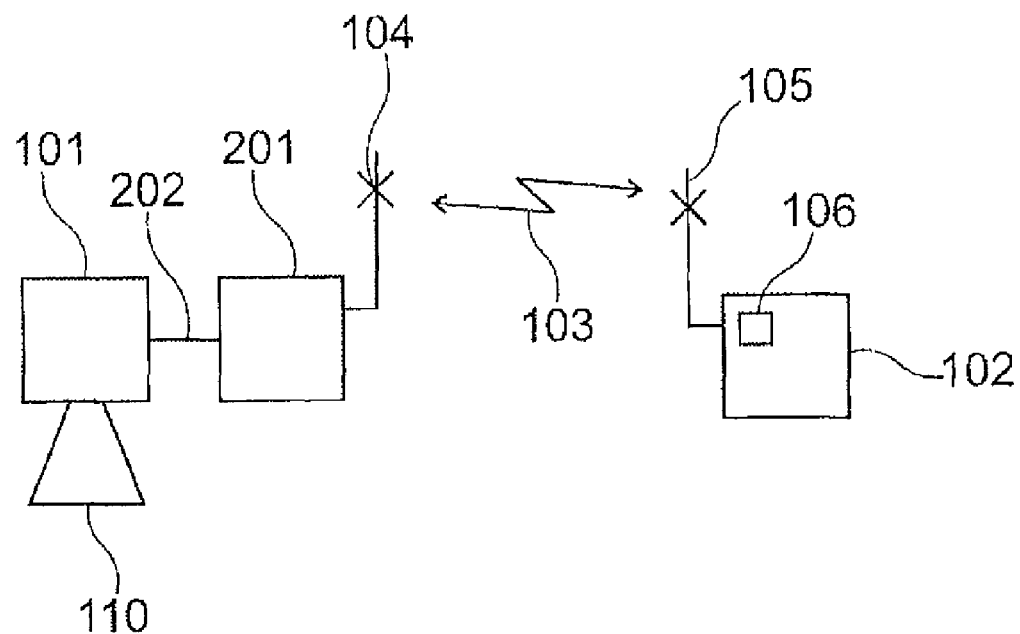
FIG. 2 shows a schematic diagram of a transmitting and receiving unit comprising a field device according to a further exemplary embodiment of the present invention, wherein the transmitting and receiving unit is connected to a filling level measuring device and is also in wireless communication with a control unit.

FIG. 2 shows a schematic diagram of a level measuring device having a transmitting and receiving unit according to a further exemplary embodiment of the present invention. The level measuring device 101 is connected to the transmitting and receiving unit 201, 104 via a data line 202. The transmitting and receiving unit is therefore not integrated in the level measuring device 101.

Since the number of tolerable defective telegrams may be adapted to the transit time of the signal, in principle an optimal retry counter can be used in the wireless communication according to the distance to be covered.

If the distance is short, normally no system-dependent communication faults are to be expected and the retry counter (error counter 106) can be set to a lower value so that the failure of a device can be detected rapidly.

If the distance between the transmitting and receiving unit 201, 104 and the control device or the base station 102, 105, 106 is greater, it can be assumed that optionally isolated telegrams are not correctly received and the retry counter 106 can be set to a higher threshold value. This may have the result that the failure of a device is detected later.

The number of tolerable defective telegrams is therefore not realized as a constant but as an adaptive parameter. This value can be changed depending on the transit time.

Figure 3:
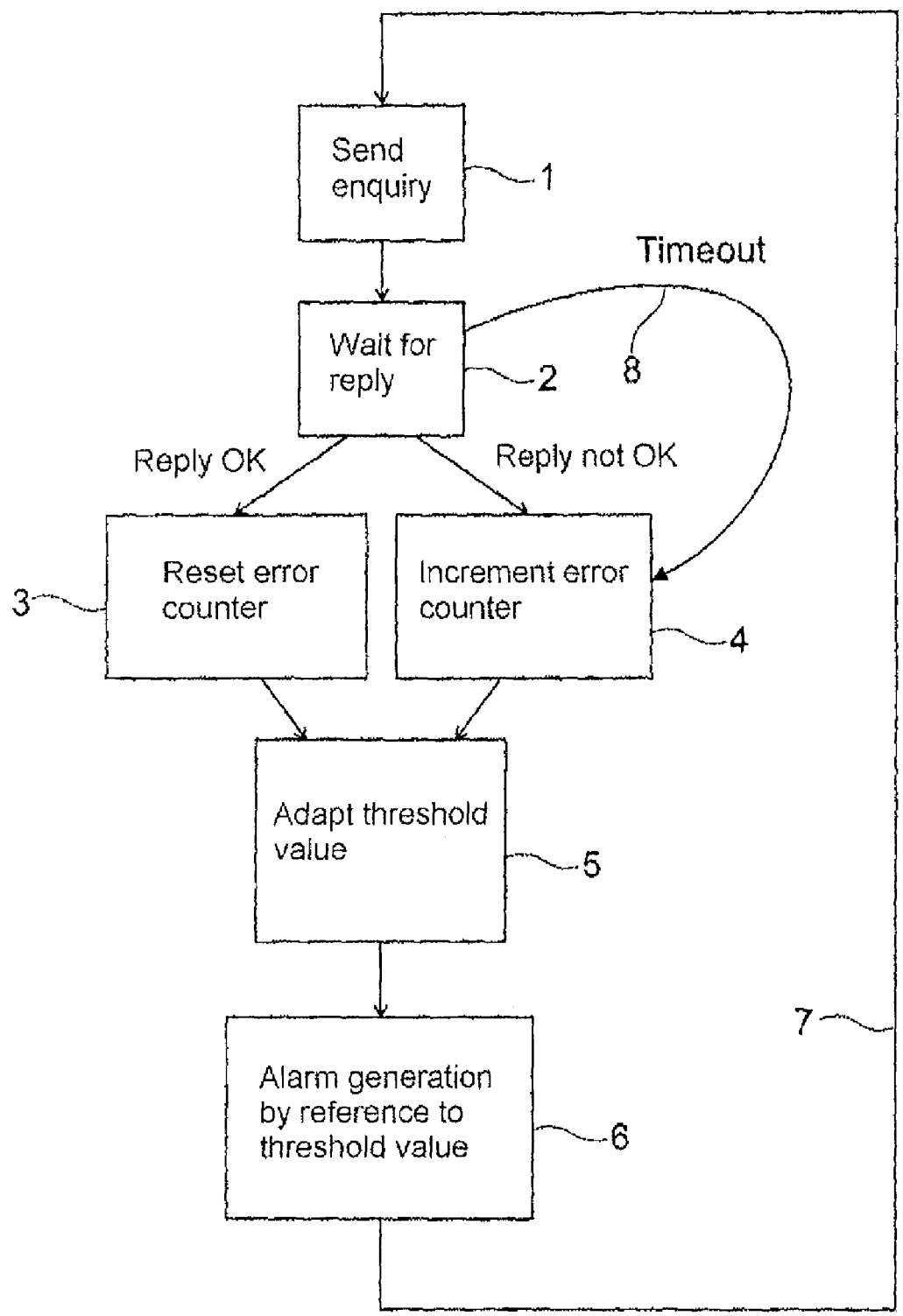
FIG. 3 shows a flow diagram of a method according to a further exemplary embodiment of the present invention.

FIG. 3 shows a flow diagram of a method according to one exemplary embodiment of the present invention.

Initially an enquiry telegram is sent in step 1. The reply telegram is then awaited in step 2. If this is correctly received within a required time, the error counter is reset in step 3 (reset). Otherwise, the error counter is incremented in step 4 (if the reply is not OK or no reply is received within a specific time interval (so-called timeout, step 8)). In the next step 5 the threshold value for the error counter is adapted. This can take place, for example, by the statistical evaluation of the maximum error counters of the last 1000 communications or by evaluating a measured quantity such as the RSSI. Finally, in step 6 the actual error counter is compared with the threshold value and if appropriate, an alarm is triggered. A renewed enquiry can then be sent again (step 7).

In addition, it should be noted that "comprising" does not excludes other elements or steps and "a" does not exclude a plurality. It should further be noted that features and steps which have been described with reference to one of the above exemplary embodiments, can also be used in combination with other features or steps of other exemplary embodiments described above. Reference numerals in the claims should not be regarded as restrictions.

The invention claimed is:

1. A system, comprising:
(a) a control unit;
(b) a field device measuring one of a filling level and a pressure and comprising a transmitting and receiving unit for wireless communication with the control unit; and
(c) an adaptive error counter of the control unit detecting and computing a sum of a number of data packets defectively received from the field device;
wherein the adaptive error counter comprises an adaptive threshold value which is used for a comparison with the sum of the detected number of defectively received data packets,
wherein the threshold value is dynamically changed during operation of the receiving unit depending on at least one of a measured signal strength of the transmitted data packets and a measured distance between the transmitting and the receiving unit and the control unit, and
wherein the control unit outputs a fault message to notify a superior management system that a communication fault has occurred when the number of defectively received data packets exceeds the threshold value.

2. The transmitting and receiving unit according to claim 1, wherein the adaptive error counter outputs a fault message when the number of defectively received data packets exceeds the threshold value.

3. The transmitting and receiving unit according to claim 1, wherein the transmitting and receiving unit changes the adaptive threshold value during operation of the receiving unit.

4. The transmitting and receiving unit according to claim 1, wherein a change of the adaptive threshold value takes place automatically.

5. The transmitting and receiving unit according to claim 1, wherein the transmitting and receiving unit determines the adaptive threshold value as a function of information provided by a user.

6. The transmitting and receiving unit according to claim 1, wherein the transmitting and receiving unit independently determines the adaptive threshold value within predefined limiting values as a function of a statistical evaluation of a running radio communication.

7. The transmitting and receiving unit according to claim 1, wherein the transmitting and receiving unit determines the adaptive threshold value as a function of a measurable quantity of the radio communication.

8. The transmitting and receiving unit according to claim 1, wherein the detected number of defectively received data packets only comprises data packets which were received successively by the transmitting and receiving unit.

9. The transmitting and receiving unit according to claim 1, wherein the field device is a filling level radar.

10. Use of a system including (a) a control unit, (b) a field device measuring a filling level and comprising a transmitting and receiving unit for wireless communication with the control unit, the control unit including an adaptive error counter detecting and computing a sum of a number of data packets defectively received from the field device, the adaptive error counter including an adaptive threshold value which is used for a comparison with the sum of the detected number of defectively received data packets, and the threshold value is dynamically changed during operation of the receiving unit depending on at least one of a measured signal strength of the transmitted data packets and a measured distance between the transmitting and the receiving unit and the control unit, the control unit outputting a fault message to notify a superior management system that a communication fault has occurred when the number of defectively received data packets exceeds the threshold value.

11. Use of a system including (a) a control unit, (b) a field device measuring a pressure and comprising a transmitting and receiving unit for wireless communication with the control unit, the control unit including an adaptive error counter detecting and computing a sum of a number of data packets defectively received from the field device, the adaptive error counter including an adaptive threshold value which is used for a comparison with the sum of the detected number of defectively received data packets, and the threshold value is dynamically changed during operation of the receiving unit depending on at least one of a measured signal strength of the transmitted data packets and a measured distance between the transmitting and the receiving unit and the control unit, the control unit outputting a fault message to notify a superior management system that a communication fault has occurred when the number of defectively received data packets exceeds the threshold value.

12. A method for measuring one of a filling level and a pressure, comprising:
  detecting and computing, by a control unit, a sum of a number of data packets received from a field device; and
  comparing the sum of the detected number of defectively received data packets with an adaptive threshold value,
  wherein the threshold value is dynamically changed during operation depending on at least one of a measured signal strength of the received data packets and a measured distance between a transmitting and a receiving unit and the communication device control unit, and
  wherein the control unit outputs a fault message to notify a superior management system that a communication fault has occurred when the number of defectively received data packets exceeds the threshold value.

13. The method according to claim 12, further comprising:
  outputting a fault message when the number of defectively received data packets exceeds the threshold value.

14. The method according to claim 12, further comprising:
  changing the adaptive threshold value during operation of the receiving unit.

\* \* \* \* \*